(12) United States Patent
Belov et al.

(10) Patent No.: US 7,147,832 B2
(45) Date of Patent: Dec. 12, 2006

(54) PROCESS FOR THE ISOLATION AND PURIFICATION OF ZIRCONIUM PEROXOSULFATE AND USES THEREOF

(76) Inventors: Vladimir Belov, 9402 Greenthread La., Zionsville, IN (US) 46077; Irina Belov, 9402 Greenthread La., Zionsville, IN (US) 46077

( * ) Notice: Subject to any disclaimer, the term of this patent is extended or adjusted under 35 U.S.C. 154(b) by 38 days.

(21) Appl. No.: 11/023,157

(22) Filed: Dec. 27, 2004

(65) Prior Publication Data

US 2005/0180911 A1 Aug. 18, 2005

Related U.S. Application Data

(60) Provisional application No. 60/533,333, filed on Dec. 30, 2003.

(51) Int. Cl.
*C01B 15/08* (2006.01)
*C01B 15/04* (2006.01)
*C01G 25/02* (2006.01)

(52) U.S. Cl. .................. 423/544; 423/82; 423/852; 423/608

(58) Field of Classification Search .............. 423/513, 423/544, 82, 85, 608
See application file for complete search history.

(56) References Cited

U.S. PATENT DOCUMENTS

| | | | |
|---|---|---|---|
| 4,115,422 A * | 9/1978 | Welch et al. | .................. 556/7 |
| 4,174,418 A | 11/1979 | Welch et al. | |
| 6,054,407 A | 4/2000 | Schulz et al. | |
| 6,703,334 B1 * | 3/2004 | Belov et al. | .................. 501/103 |

OTHER PUBLICATIONS

Chemical Abstract acccession No. 89:98936, "Dizirconium trioxide sulfate-Zr2O3SO4". Jere, G.V., et al., Bulletin of the Chemical Society of Japan, vol. 51, No. 7, p. 2190, 1978.*
Chemical Abstract acccession No. 141:264553, for ES 2190300 A1, published Jul. 16, 2003.*
DERWENT abstract accession No. 2003-600609, for ES 2190300 A1, published Jul. 16, 2003.*
esp@cenet abstract, Worldwide database, for ES 2190300 A1, published Jul. 16, 2003.*
Full English translation of Tikhomirov et al., Precipitation of Peroxide Compounds of Zirconium from Sulfate Solutions, Zhurnal Neorganicheskoi Khimii, 1962, 7, pp. 1860-1868.*
Blumental, "The Chemical Behavior of Zirconium", D. Van Nostrand Company, Inc., Princeton, NJ, 1958, pp. 198-200 and 244-249.*
Tarafder et al.-"Novel Peroxo Complexes of Zirconium Containing Organic Ligands", Inorg. Chem., 1986, v.25, pp. 2265-2268.
Dengel et al.-"Studies on Transition Metal Peroxo Complexes-IX. Carboxylato Peroxo Complexes of Niobium, Tantalum, Zirconium and Hafnium", Polyhedron, 1989, v.8, 11, 1371-1377.
Schwarz et al.-"Uber die Peroxyde des Titans, Zirkons, Hafniums and Thoriums", Z.anorg. Und allgem. Chemie, 1928, v.176, pp. 219-220.
Tikhomirov et al.-Precipitation of Peroxide Compounds of Zirconium from Sulfate Solutions, Zhurnal Neorganicheskoi Khimii, 1962, 7, pp. 1860-1868.
Jere et al.- "Studies on Peroxo Sulfato Zirconium(IV) Complex", J. Inorg. Nucl. Chem, 1970, v.32, pp. 537-542.
Mimoun et al.-"Novel Unusually Stable Peroxotitanium(IV) Compounds. Molecular and Crystal Structure of . . . ", Inorg. Chem., 1982, v.21,pp. 1303-1306.
Westland et al.-"Novel Peroxo Complexes of Thorium Containing Organic Ligands", Inorg. Chem., 1982, v.21, pp. 3228-3232.

* cited by examiner

*Primary Examiner*—Stanley S. Silverman
*Assistant Examiner*—Ardith E. Hertzog

(57) ABSTRACT

Provided is a process for isolating zirconium peroxosulfate and its use, either as is or to prepare high purity zirconium compounds including powders of zirconium dioxide and stabilized zirconia. The process is based on precipitating a peroxide compound from an acidic peroxide solution of zirconium and provides a simple, economical method for producing the zirconium peroxosulfate powder and its derivatives with degree of zirconium recovery more than 99%. This process further provides an effective method for the separation and purification of zirconium from a variety of elements and/or naturally occurring ores.

12 Claims, 9 Drawing Sheets

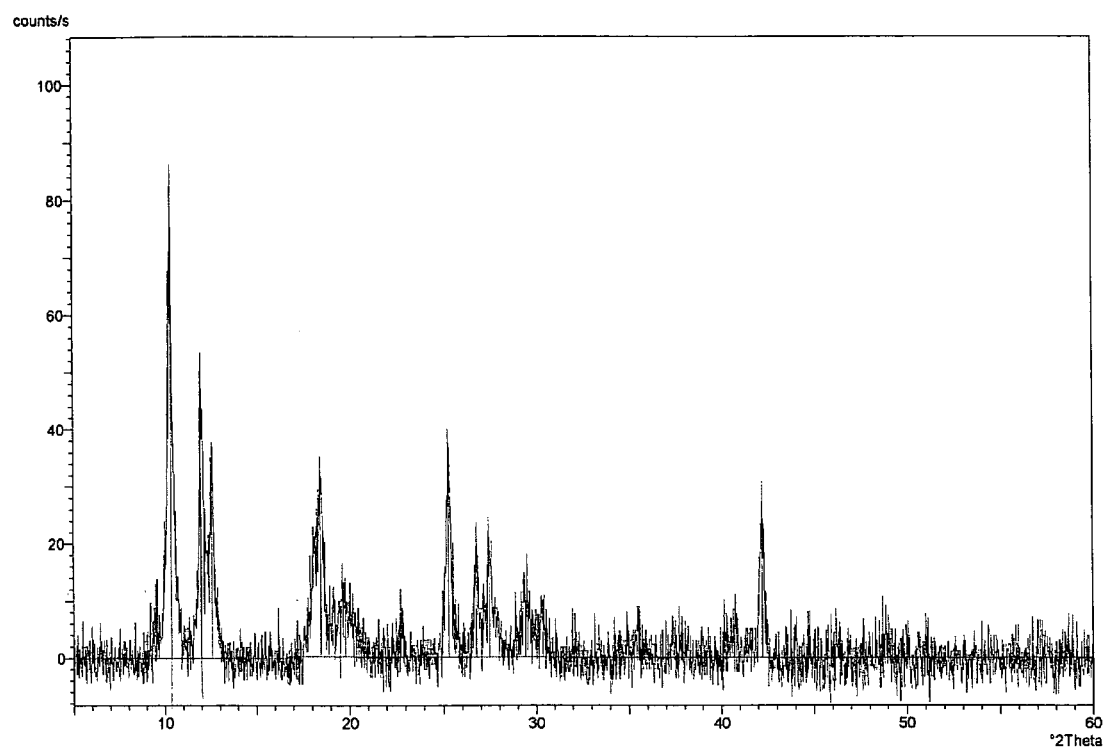
FIG. 1. X-Ray diffraction pattern of as precipitated zirconium peroxosulfate having composition of Zr2(SO4)(O2)3 x 12H2O.

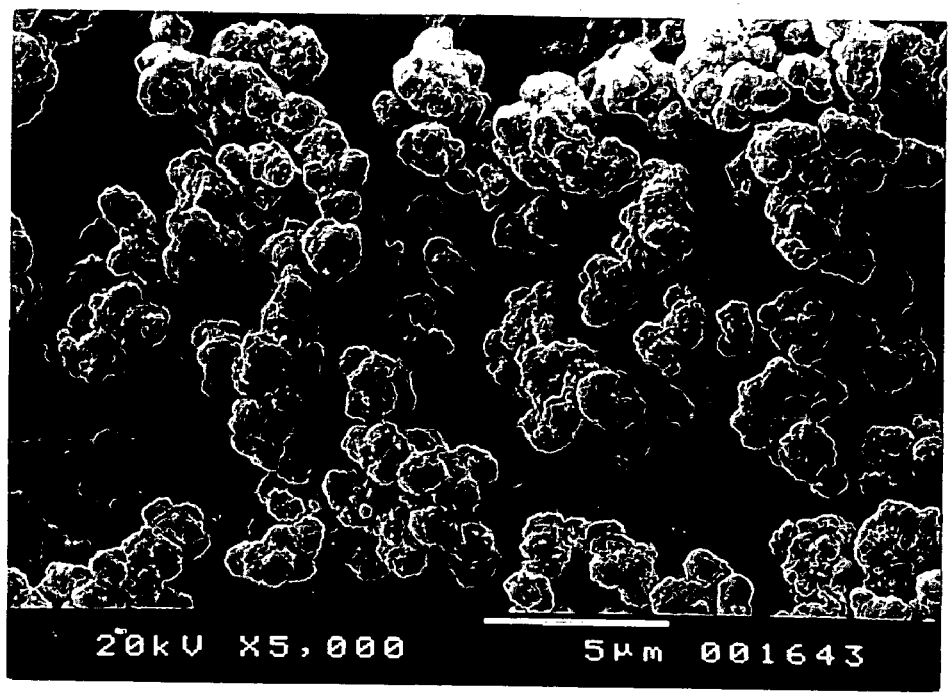
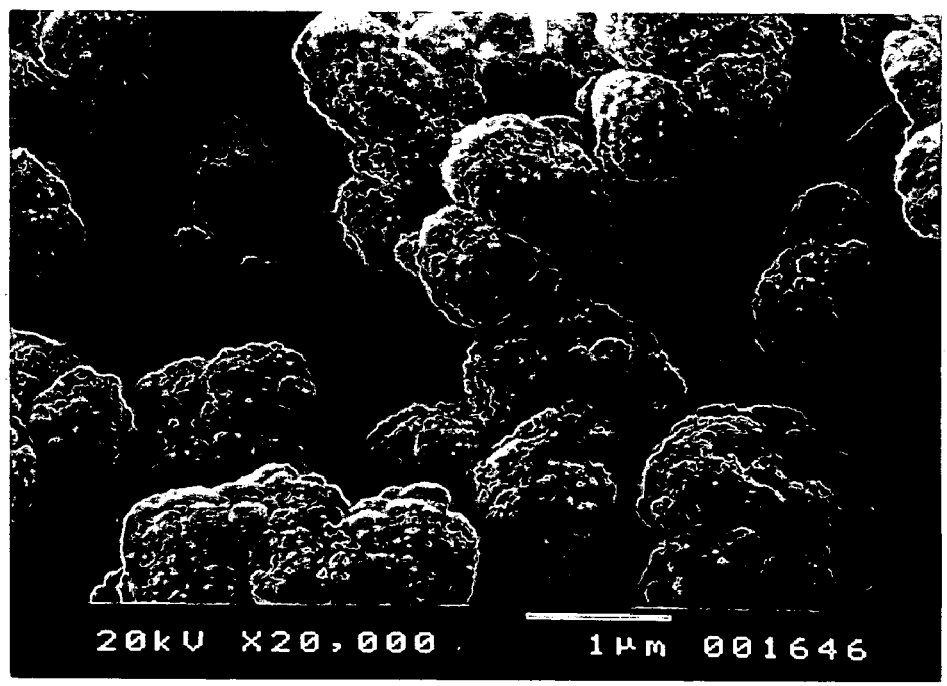
FIG. 2. SEM image of zirconium peroxosulfate powder.

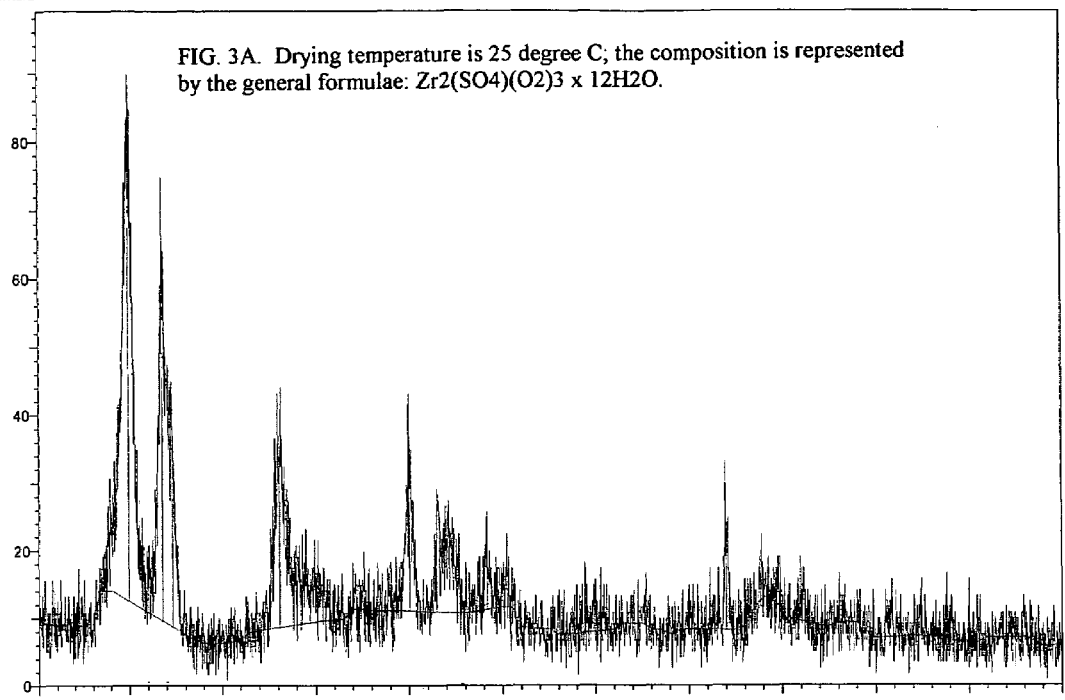
FIG. 3A. Drying temperature is 25 degree C; the composition is represented by the general formulae: Zr2(SO4)(O2)3 x 12H2O.
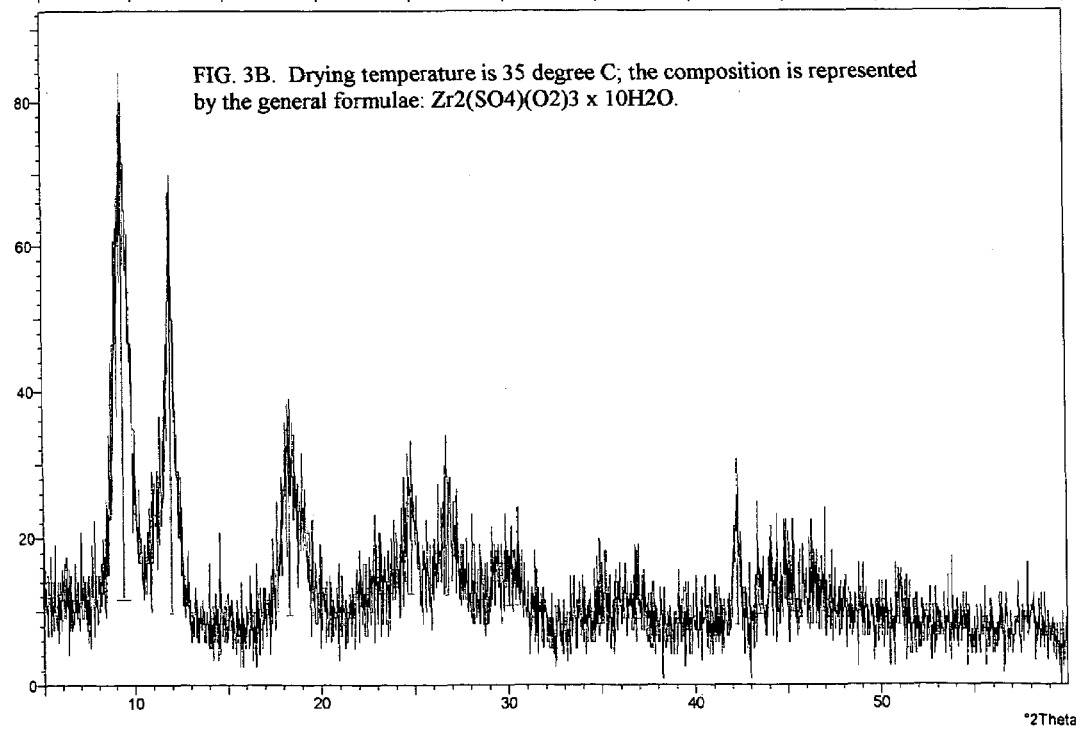
FIG. 3B. Drying temperature is 35 degree C; the composition is represented by the general formulae: Zr2(SO4)(O2)3 x 10H2O.

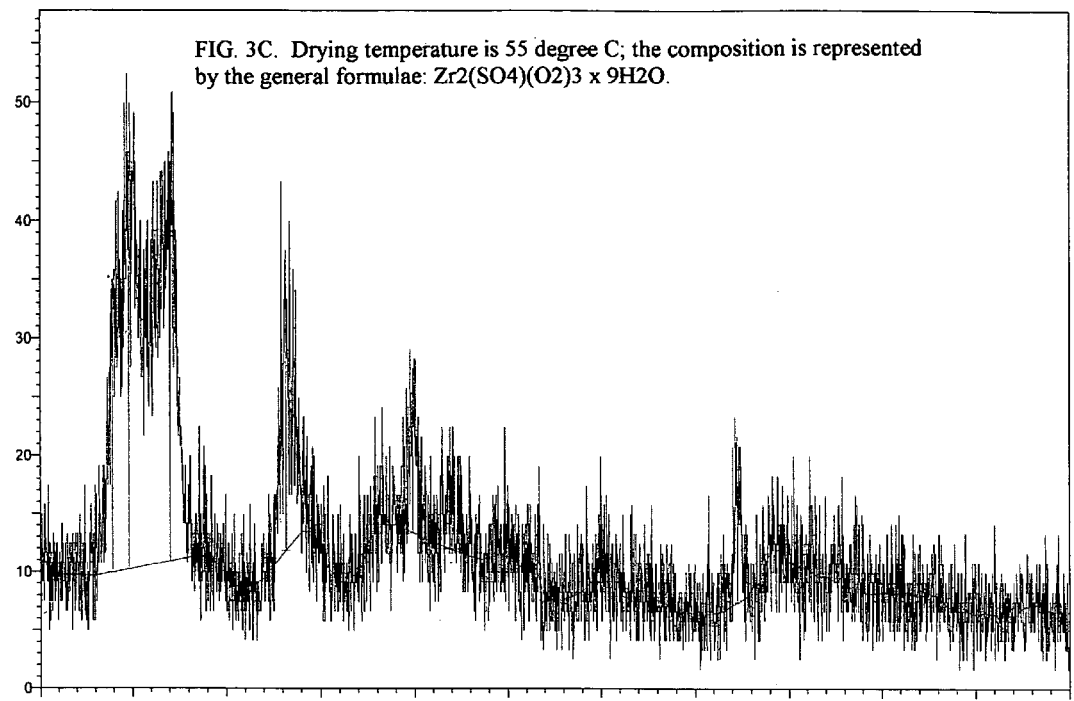
FIG. 3C. Drying temperature is 55 degree C; the composition is represented by the general formulae: Zr2(SO4)(O2)3 x 9H2O.
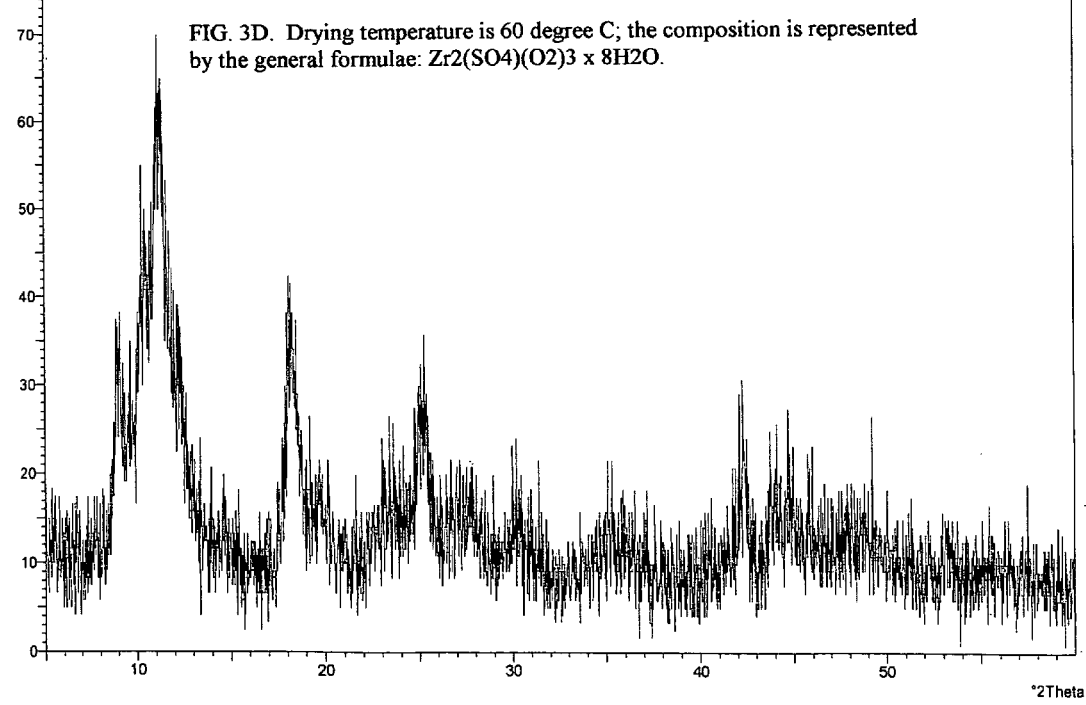
FIG. 3D. Drying temperature is 60 degree C; the composition is represented by the general formulae: Zr2(SO4)(O2)3 x 8H2O.

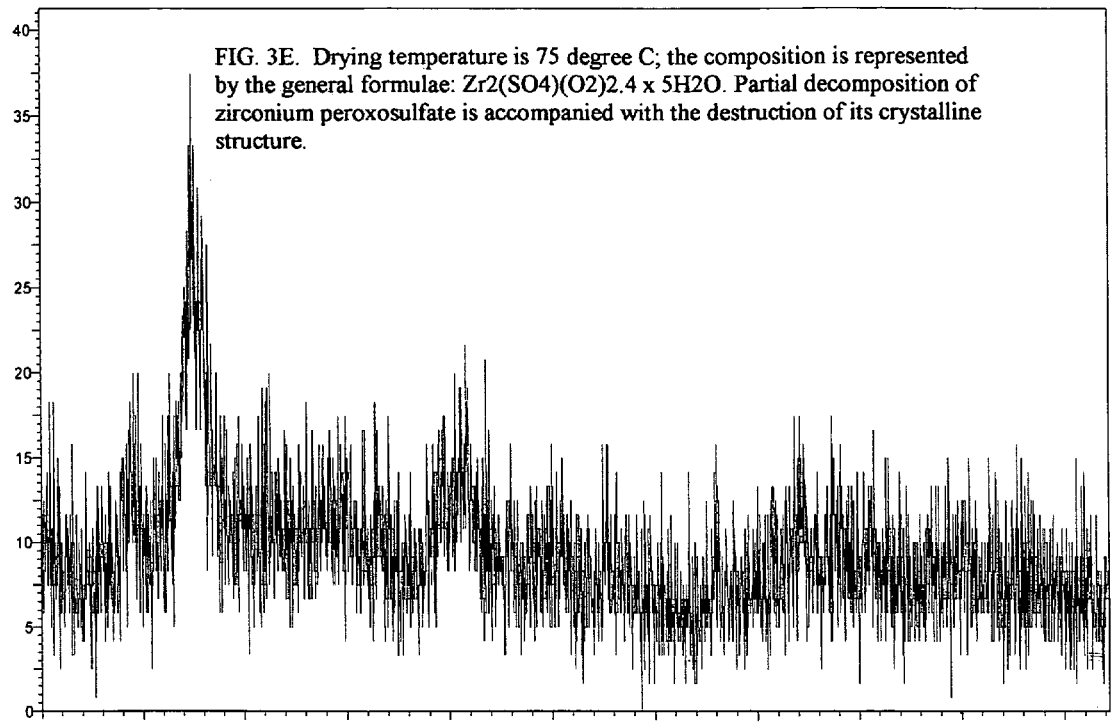

FIG. 3E. Drying temperature is 75 degree C; the composition is represented by the general formulae: $Zr_2(SO_4)(O_2)_{2.4} \times 5H_2O$. Partial decomposition of zirconium peroxosulfate is accompanied with the destruction of its crystalline structure.

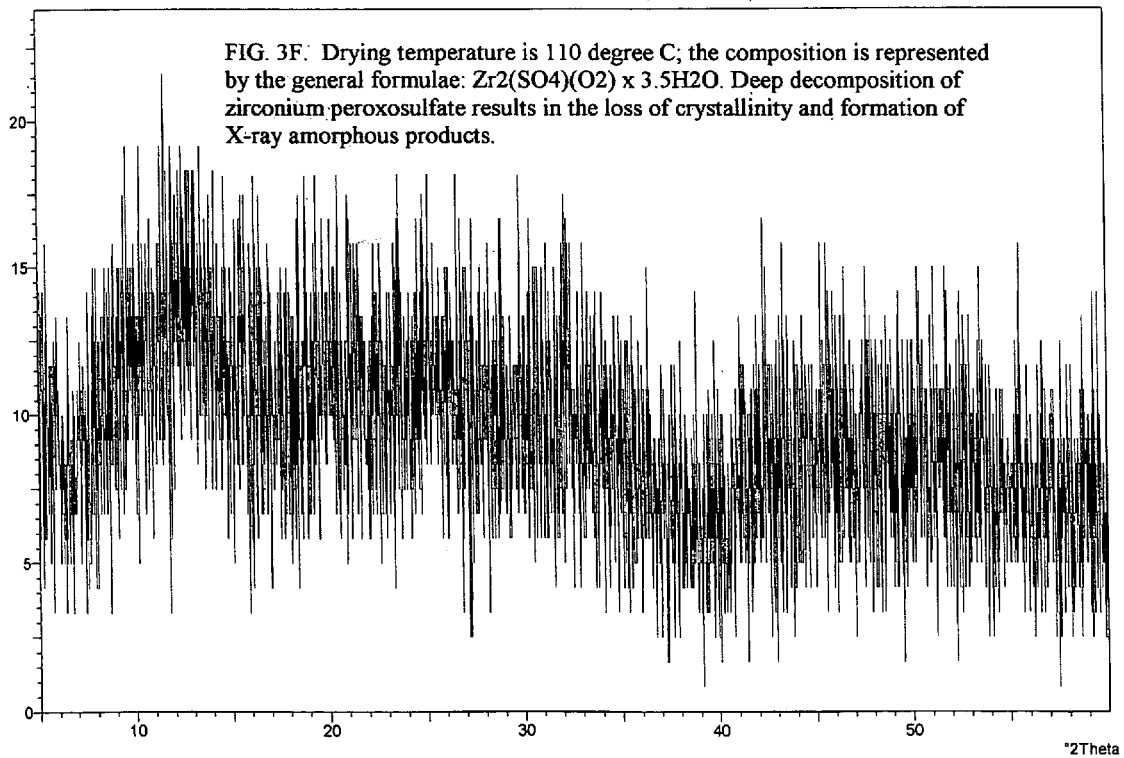

FIG. 3F. Drying temperature is 110 degree C; the composition is represented by the general formulae: $Zr_2(SO_4)(O_2) \times 3.5H_2O$. Deep decomposition of zirconium peroxosulfate results in the loss of crystallinity and formation of X-ray amorphous products.

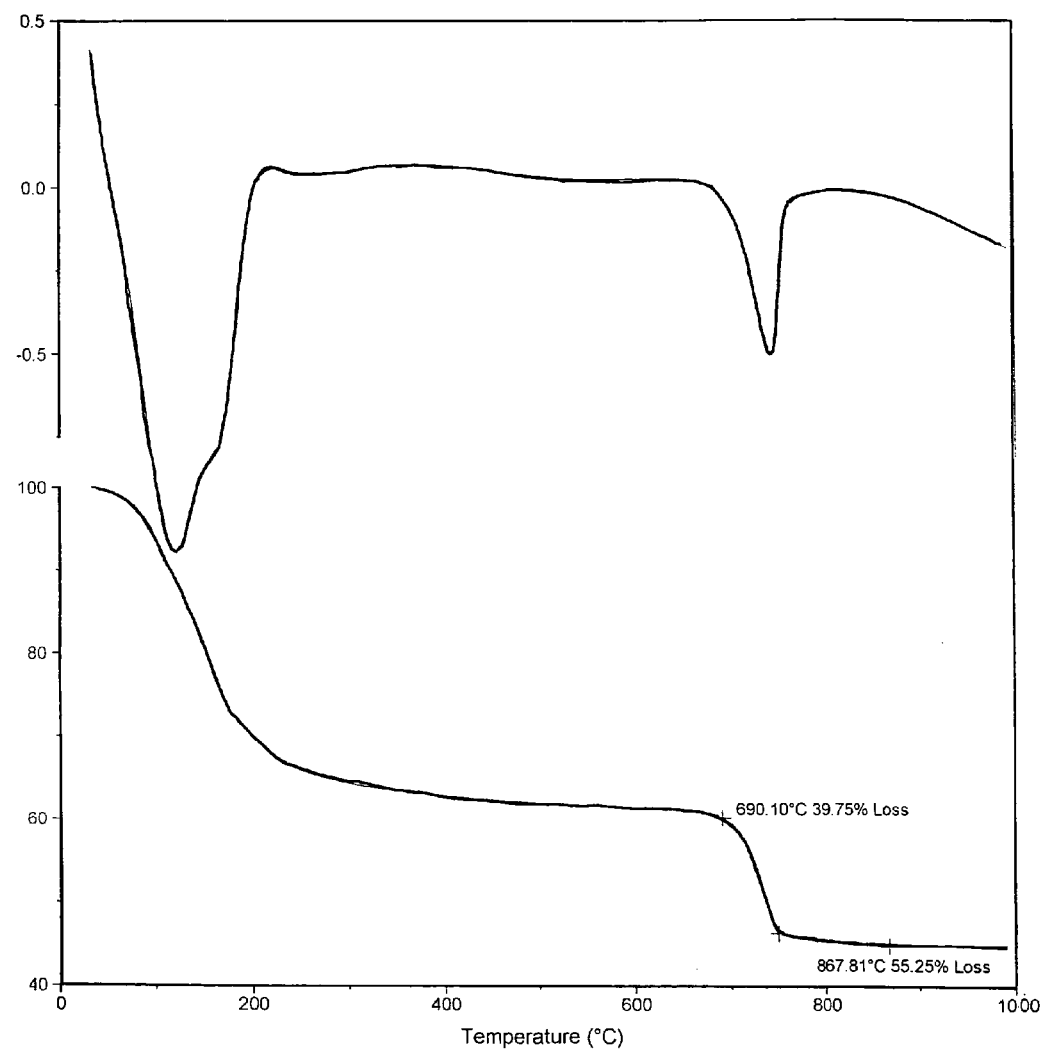
FIG. 4. Thermal analysis graphs showing weight losses and thermal effects accompanying decomposition of zirconium peroxosulfate.

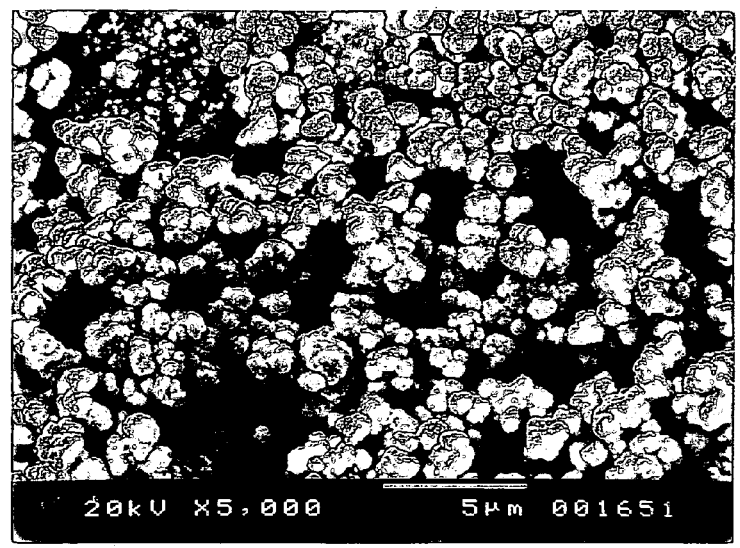
(FIG. 5A)
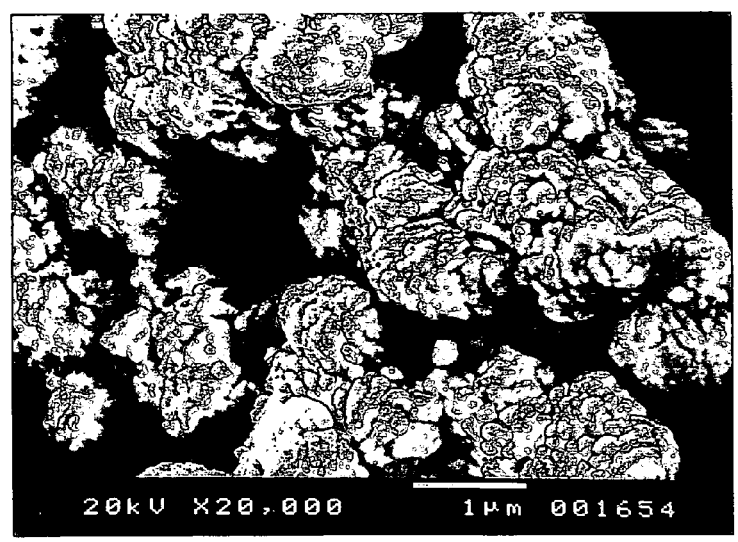
(FIG. 5B)
FIG. 5. SEM image of zirconium dioxide powder prepared by thermal decomposition of zirconium peroxosulfate at 900 degree C.

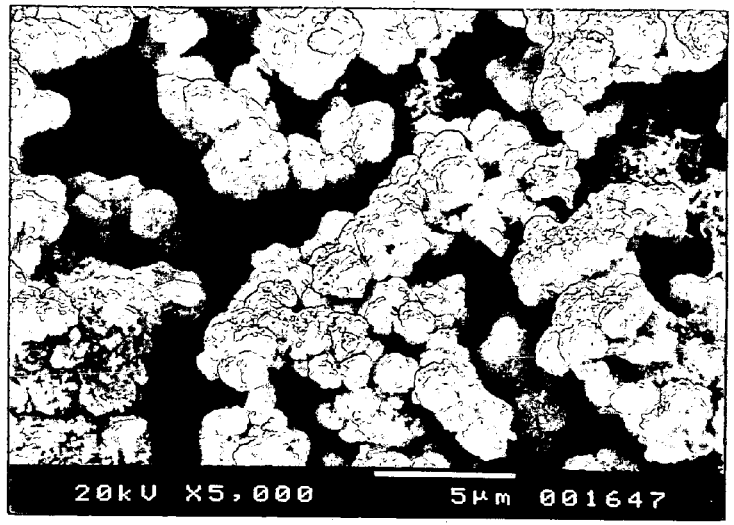
(FIG. 6A)
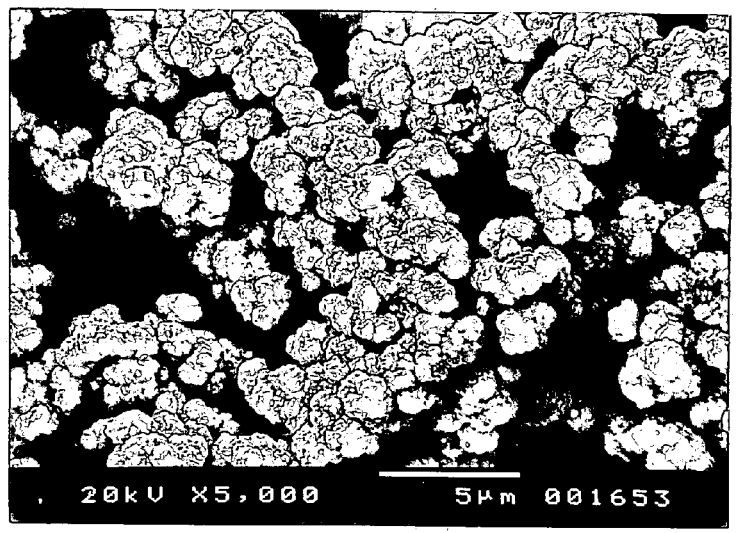
(FIG. 6B)
FIG. 6. SEM image of free of sulfates derivative of zirconium peroxosulfate having composition of ZrO(O2) x 2H2O (FIG. 6A) and SEM image of zirconium dioxide powder prepared by thermal decomposition of free of sulfate derivative of zirconium peroxosulfate (FIG. 6B).

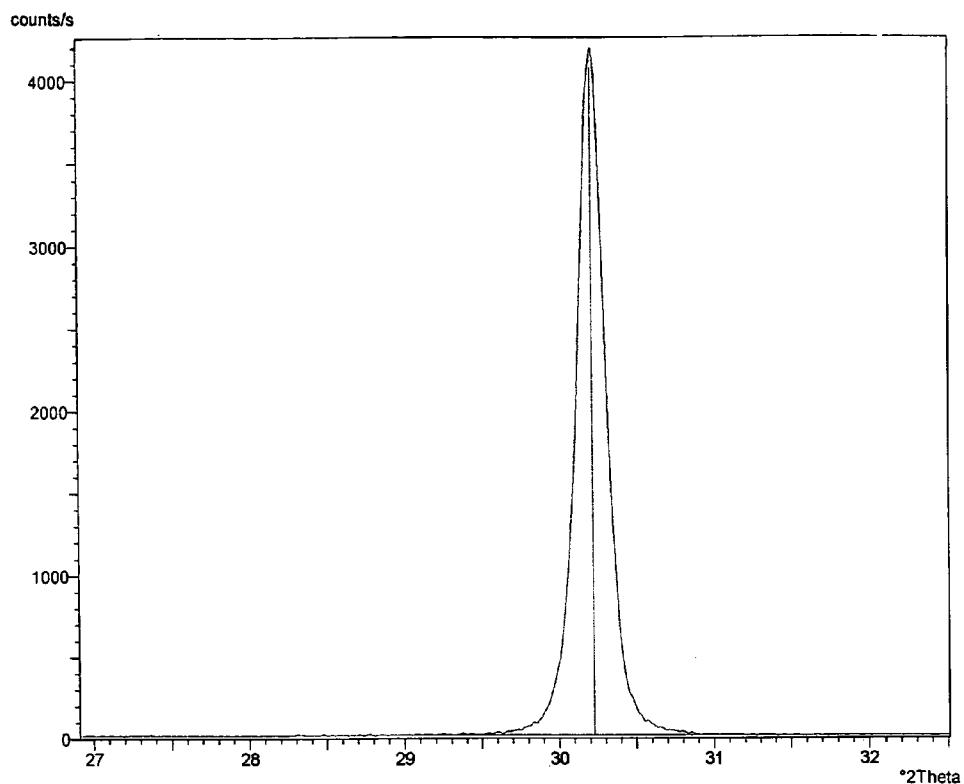
(FIG. 7A)
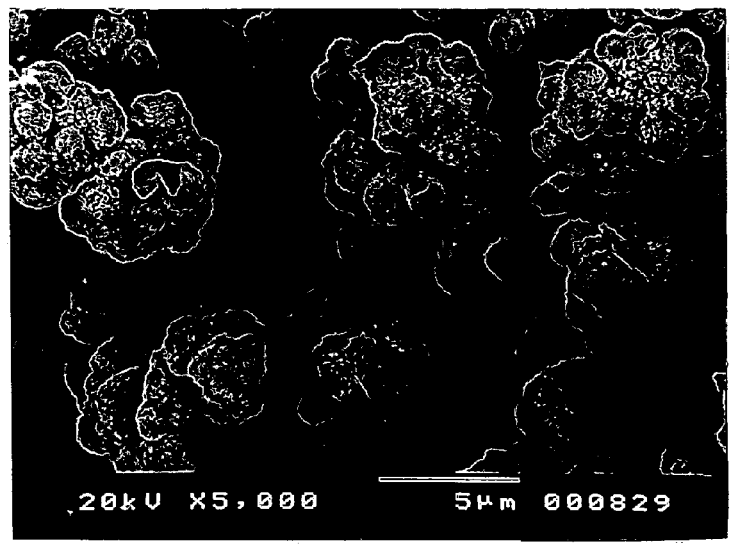
(FIG. 7B)
FIG. 7. X-ray diffraction pattern (FIG. 7A) and SEM image (FIG. 7B) of yttrium stabilized zirconia powder prepared by heterogeneous reaction of zirconium peroxosulfate and yttrium oxide.

PROCESS FOR THE ISOLATION AND PURIFICATION OF ZIRCONIUM PEROXOSULFATE AND USES THEREOF

REFERENCE TO RELATED APPLICATIONS

This application claims priority to U.S. provisional application No. 60/533,333 filed on Dec. 30, 2003, which is incorporated by reference herein.

BACKGROUND OF THE INVENTION

1. Field of the Invention

The present invention relates to a process for isolating and purifying zirconium species. More specifically, the present invention provides a process for purifying and isolating zirconium as zirconium peroxosulfate and its use, either as is or to prepare additional zirconium species.

2. Description of the Related Art

A wide variety of zirconium species both neutral and salts are known. The chemistry and synthesis of various zirconium species has been reviewed by Blumenthal, in "*The Chemical Behavior of Zirconium*", D. Van Nostrand Co., 1958. In this review, certain peroxo compounds of zirconium are disclosed. These zirconium peroxides can be prepared by adding an alkali metal hydroxide in combination with hydrogen peroxide to an aqueous solution containing zirconium salts.

In U.S. Pat. No. 4,174,418 issued to Welch et al., an insoluble peroxide complex of zirconium is described. The zirconium peroxide complex can be prepared by combining zirconyl acetate and hydrogen peroxide in an aqueous solution. In solution this mixture initially forms a gelatinous product, which is collected and then dried at about 80° C. The resulting zirconium species contains both acetyl groups and peroxide groups and can be used for a variety of medicinal uses, including as an antibacterial substance. Tarafder et al in "*Novel Peroxo complexes of Zirconium Containing Organic Ligands*", Inorg. Chem., v.25, pp. 2265–2268, 1986, described synthesis of several organoperoxo complexes of Zr(IV) along with their properties with respect to oxygen transfer to various substrates; these peroxo complexes were found to be very stable. Carboxylato peroxo complexes of zirconium were prepared by Dengel et al ("*Studies on Transition Metal Peroxo Complexes-IX. Carboxylato Peroxo Complexes of Niobium, Tantalum, Zirconium and Hafnium*", Polyhedron, v.8, pp. 1371–1377, 1989) through reaction of zirconyl chloride with potassium salts of oxalic, citric, tartaric and glycolic acids; the complexes' structure was investigated.

Schwarz et al. in Z. Anorg. und Allgem. Chemie, v.176, pp. 219–220, 1928 describes preparing zirconium peroxosulfate with the molar composition of $Zr_2(O_2)_3(SO_4) \times 8H_2O$. The zirconium peroxosulfate was isolated as a solid crust from a solution that contained both zirconium sulfate and hydrogen peroxide. However, the solid crust did not form until the solution was maintained at about 0° C. for more than six days. Consequently, this method of preparation is highly undesirable, requiring low temperatures and very long times to isolate the final product. Additionally, the compound is provided in the form of a solid crust, which entraps a variety of byproducts, excess reagents, starting materials, and reaction solution. Consequently the initially isolated product may not be pure and requires extensive purification steps to provide a zirconium species that can be used.

Thkhomirov et al in "*Precipitation of Peroxide Compounds of Zirconium from Sulfate Solutions*", Zhurnal Neorganicheskoi Khimii, v. 7, pp. 1860–1868, 1962 studied precipitation of zirconium peroxo compounds from solutions of zirconyl sulfate with hydrogen peroxide. After several days of keeping the reaction mixture at room temperature the zirconium peroxosulfate with composition $Zr_2(O_2)_3(SO_4) \times nH_2O$ (n=8–10) was precipitated from the solutions with pH=0.1–0.7. According to the authors, precipitation was incomplete and the disclosed process was not able to provide efficient recovery of zirconium from the starting solution.

The above preparation was repeated by Jere et al in "*Studies on Peroxo Sulfato Zirconium (IV) Complex*", J. Inorg. Nucl. Chem., v. 32, pp. 537–542, 1970 and the compound with the molar composition $Zr_2(O_2)_3(SO_4) \times 10H_2O$ was obtained; spectroscopic, thermal and magnetic properties of the prepared zirconium peroxosulfate were characterized and its molecular structure was proved as having the sulfato group bridging two zirconium atoms and both the triangularly linked and the bridging type peroxo groups.

Therefore, methods of preparation of the zirconium peroxosulfate compound disclosed in the prior art do not enable separation of the zirconium peroxosulfate as a pure compound with sufficient recovery of zirconium species from the starting solutions. Consequently, there is no disclosure in the prior art of any uses of the zirconium peroxosulfate, neither as is nor as an intermediate for preparation of other zirconium containing compounds.

To overcome the disadvantages associated with the art related methods of preparation of zirconium peroxo compounds the present invention provides a novel way for preparing and isolating zirconium peroxosulfate that is both economical and suitable for industrial applications therefore enabling novel ways of usage of the zirconium peroxosulfate compound.

One object of the present invention is to provide a zirconium peroxosulfate compound as a pure microcrystalline powder comprising globular particles.

Another object of the invention is to provide a process for preparing a peroxo compound of zirconium that enables preparation and isolation of zirconium peroxosulfate within a selected time period with high degree of zirconium recovery.

A further object of the invention is to provide a process for separation of zirconium from metallic and nonmetallic compounds and purification of zirconium from impurities through highly selective precipitation of zirconium from starting solutions in the form of zirconium peroxosulfate.

It is yet a further object of the invention, to provide novel ways of using the zirconium peroxosulfate compound as intermediate zirconium species for preparing other zirconium containing compounds such as sulfate-free peroxo zirconium derivatives, zirconium dioxide and stabilized zirconia powders in the tetragonal or cubic crystalline phase.

Other objects and advantages of the invention will become apparent to one skilled in the art on a review of the specification, figures and claims appended hereto.

SUMMARY OF THE INVENTION

The present invention provides a process for purifying and isolating zirconium peroxosulfate and its use, either as is or to prepare additional zirconium species. Various aspects of the invention are novel, nonobvious, and provide various advantages. While the actual nature of the invention covered herein can only be determined with reference to the claims appended hereto, certain compositions and processes, which are characteristic of the preferred embodiments disclosed herein, are described briefly as follows.

According to a first aspect of the invention, a microcrystalline powder of zirconium peroxosulfate is provided with the molar composition represented below by the general formula $$Zr_2(SO_4)(O_2)_3 \times nH_2O \qquad (1)$$

where n can be between 7 and 12, wherein said powder is provided as globular particles of less than 100 microns in size.

According to another aspect of the invention, a process is provided for preparing a peroxide compound of zirconium by precipitating the zirconium peroxosulfate from an acidic solution containing zirconium species, sulfate ions, and hydrogen peroxide, hereinafter an acidic peroxide solution of zirconium. Zirconium peroxosulfate is precipitated from an acidic peroxide solution of zirconium having acidity of less than about 7N total acid per g-atom zirconium which is agitated and maintained at a temperature of not higher than about 60° C., for a period of time. The process of the present invention provides high degree of zirconium recovery from the starting acidic peroxide solution in the form of zirconium peroxosulfate within short processing time. In a preferred embodiment, more than about 90% by weight of the zirconium can be recovered; in a more preferred embodiment, greater than about 98% by weight of the zirconium can be recovered from the starting acidic peroxide solution. In still yet a more preferred embodiment, more than 99.8% by weight of zirconium can be precipitated as zirconium peroxosulfate.

According to yet another aspect of the invention, a process for producing a dry powder of zirconium peroxosulfate is provided. The powder is obtained by drying the zirconium peroxosulfate precipitate at a temperature of not higher than 80° C.

In still another aspect, the present invention provides a process for isolating and purifying zirconium from a mixture of different metal salts and/or naturally occurring ore. It has been discovered that the purification process of the present invention provides an effective means for separation and purification of zirconium from a mixture that contains a number of other elements, materials, salts, and neutral compounds.

In still yet another aspect, the present invention provides a process for obtaining sulfate-free peroxo zirconium derivatives, said process comprising neutralization of zirconium peroxosulfate precipitate with bases.

According to still yet another aspect of the invention, a process to prepare stabilized zirconium dioxide powder in the tetragonal or cubic crystalline phase is provided. The process comprises mixing zirconium peroxosulfate with a stabilizer compound, such as a compound of yttrium, cerium, magnesium and the like, followed by the mixture calcination.

BRIEF DESCRIPTION OF THE DRAWINGS

FIG. 1 is an X-ray diffraction pattern of zirconium peroxosulfate having a composition of $Zr_2(SO_4)(O_2)_3 \times 12H_2O$ in accordance with the present invention.

FIG. 2 are a pair of Scanning Electron Microscopy (SEM) micrographs of particles of zirconium peroxosulfate powder prepared in accordance with the present invention.

FIGS. 3A through 3F are a series of X-ray diffraction patterns of zirconium peroxosulfate powders prepared according to the present invention and dried at different conditions illustrating that the different powders entrain varying amounts of water.

FIG. 4 is a thermal gravimetric analysis (TGA) data of the thermal decomposition of zirconium peroxosulfate prepared in accordance with the present invention.

FIGS. 5A and 5B are a series of SEM micrographs of zirconium dioxide powders obtained by the thermal decomposition of zirconium peroxosulfate, which was prepared in accordance with the present invention.

FIG. 6A is a SEM micrograph of a sulfate-free derivative of zirconium peroxosulfate having a composition of $ZrO(O_2) \times 2H_2O$ prepared in accordance with the present invention.

FIG. 6B is a SEM micrograph of zirconium dioxide powder obtained by the thermal decomposition of the sulfate-free derivative of zirconium peroxosulfate of FIG. 6A.

FIG. 7A is an X-ray diffraction pattern of yttrium stabilized zirconia (YSZ) powder prepared in accordance with the present invention by the heterogeneous reaction of zirconium peroxosulfate and yttrium oxide.

FIG. 7B is a SEM micrograph of the yttrium stabilized zirconia powder prepared as described in FIG. 7A.

DETAILED DESCRIPTION OF THE INVENTION

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described processes, composition or formulations, and any further applications of the principles of the invention as described herein, are contemplated as would normally occur to one skilled in the art to which the invention relates.

It has been determined that zirconium peroxosulfate can be prepared according to the following equation (1) which is not necessarily reflects the actual nature of zirconium species existing in the acidic peroxide solution and in zirconim peroxosulfate:

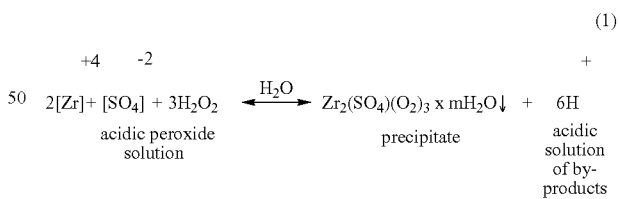

(1)

$$2[Zr]^{+4} + [SO_4]^{-2} + 3H_2O_2 \xrightleftharpoons{H_2O} Zr_2(SO_4)(O_2)_3 \times mH_2O\downarrow + 6H^+$$

acidic peroxide solution → precipitate + acidic solution of by-products

It was found that the reaction represented by equation (1) is reversible and zirconium peroxosulfate is soluble in strong acids, for example in sulfuric acid, nitric acid, hydrochloric acid and the like. Consequently, when the acidic peroxide solution contains greater than about 7N total acid per g-atom zirconium, then the precipitation of zirconium peroxosulfate may not occur or the amount of recovered zirconium peroxosulfate may be low. Consequently, the recovery degree of zirconium in the form of zirconium peroxosulfate may also be low.

As employed herein, the term "acidity" refers to the acidity of a peroxide solution of zirconium considered as a whole as determined by titration with a suitable standard, such as a sodium hydroxide solution.

According to the present invention, the process of precipitating zirconium peroxosulfate comprises combining a zirconium species in a form of solution or a solid, a sulfate ion species in a form of solution or a solid, and hydrogen peroxide in a form of an aqueous solution to provide an acidic peroxide solution containing zirconium and sulfate. In accordance with reaction (1) and stoichiometric composition of zirconium peroxosulfate compound, the acidic peroxide solution is required having a sulfate/zirconium molar ratio of not less than about 1:2 and a hydrogen peroxide/zirconium molar ratio of not less than about 3:2.

According to the present invention, the acidic peroxide solution is required to contain zirconium and sulfate with a sulfate/zirconium molar ratio of greater than about 1:2 and a hydrogen peroxide/zirconium molar ratio of greater than about 3:2 to achieve the recovery degree of zirconium in the form of zirconium peroxosulfate of at least 25% by weight within 24 hours after preparing the solution.

When the acidity of the peroxide solution is less than about 6N total acid per g-atom of zirconium, sulfate/zirconium molar ratio is greater than about 1:2 and a hydrogen peroxide/zirconium molar ratio is greater than about 3:2, at least about 98% by weight of zirconium can be recovered in the form of zirconium peroxosulfate within 10 hours after preparing such a solution.

The acidity of peroxide solution of zirconium can be adjusted by neutralizing any excess acid with a base. Any commonly used and/or known base can be used. Examples of suitable bases for use in the present invention include, but are not restricted to, the group consisting of hydroxide, carbonate, bicarbonate of ammonium, sodium, potassium calcium, magnesium, or any combination of these. The adjustment of the acidity may be performed by adding a base either as a solid or as a solution to the acidic peroxide solution containing zirconium. The order of addition is not critical. A base can also be added to a solution of a zirconium species, to a solution of sulfate ion species or to an aqueous solution of hydrogen peroxide prior to combining them in an acidic peroxide solution of zirconium.

The process for combining a zirconium species, a sulfate ion species and hydrogen peroxide to provide an acidic peroxide solution containing zirconium and sulfate can be accomplished by a number of similar routes. For example, an acidic peroxide solution containing zirconium and sulfate can be prepared by dissolving crystalline zirconium sulfate having a composition of $Zr(SO_4)_2 \cdot 4H_2O$, which is commercially available product, in a solution of hydrogen peroxide. When $Zr(SO_4)_2 \cdot 4H_2O$ is used, the concentration of hydrogen peroxide solution should be at least 0.5 mol/liter. Quantity of zirconium sulfate taken for dissolving should also provide concentration of an acidic peroxide solution of not less than 0.3 mol/liter of zirconium and peroxide to zirconium sulfate molar ratio of not less than about 3:2.

Alternatively, a zirconium sulfate-containing solution can be prepared first, combined then with an aqueous solution containing hydrogen peroxide to provide an acidic peroxide solution containing zirconium and sulfate. The order of combining is not critical for the invention thus a zirconium sulfate-containing solution can be added to an aqueous solution containing hydrogen peroxide or vice versa.

For preparing such a zirconium sulfate-containing solution commercially available zirconium sulfate salt can be dissolved in water, an alcohol or any combination of these.

Alternatively, a zirconium sulfate-containing solution can be prepared in situ by any of known means including, but not limited to:

dissolving zirconium basic carbonate, zirconium hydroxide, zirconium oxide, or any combination of these in a solution of sulfuric acid;

dissolving an alkali salt of zirconium such as sodium zirconate, potassium zirconate, calcium zirconate, or any combination of these in a solution of sulfuric acid; and dissolving zirconium chloride, zirconium nitrate or any combination of these in a solution of sulfuric acid.

It was discovered that precipitation of zirconium peroxosulfate from an acidic peroxide solution containing zirconium and sulfate is a highly selective reaction with respect to zirconium and provides highly effective means for separation and purification of zirconium from variety of metallic and nonmetallic elements. It was found that once the acidic peroxide solution is clear from any solid or colloid particulates none of any other metallic or nonmetallic element coprecipitates with zirconium, except for hafnium.

Thus the present invention provides highly effective means for separation and purification of zirconium from variety of metallic and nonmetallic elements as it is illustrated in the following examples, including zirconium recovery from its natural ores such as baddelite and zircon.

According to the present invention the high efficiency of purification is provided by:

selectivity of precipitation of zirconium peroxosulfate from highly acidic peroxide solution;

insolubility of zirconium peroxosulfate in highly acidic media in the presence of hydrogen peroxide that allows to remove soluble by-products of the reaction from the precipitate by washing the precipitate with a mixture of solutions of sulfuric acid and hydrogen peroxide;

possibility to reprecipitate zirconium peroxosulfate from its solution in sulfuric acid by adding appropriate quantity of hydrogen peroxide according to the present invention.

Consequently, within the scope of the present invention the zirconium sulfate-containing solution may contain other acidic ions as desired or present in a sample. For example, the acidic ion may be nitrate, chloride, acetate, fluoride, peroxide or any combination of these. The content of these ions can vary.

The zirconium sulfate-containing solution may also contain another metallic and non-metallic ions as desired or present in a sample. For example, the ion may be ammonium, sodium, potassium, calcium, magnesium, or any combination of these. The concentration and amounts of these ions can vary without significantly impacting the isolation, yield, and/or purity of the isolated zirconium peroxosulfate.

In the practice of the present invention, when a zirconium sulfate-containing solution is combined with an aqueous hydrogen peroxide solution, the zirconium sulfate-containing solution preferably has a concentration of zirconium of more than 0.3 g-atom Zr/liter, sulfate/zirconium molar ratio of greater than 1:2, whereas the aqueous solution of hydrogen peroxide should have a concentration of not less than about 0.5 mol/liter to provide required hydrogen peroxide/zirconium molar ratio of greater than about 3:2.

An aqueous solution of hydrogen peroxide can then be prepared separately. Under the scope of the present invention the aqueous solution of hydrogen peroxide is any water miscible solution containing not less than about 0.5 mol/liter hydrogen peroxide such as, but not limited to, water solution of hydrogen peroxide, an alcohol solution of hydrogen peroxide, or any combination of these. The solution may contain any acidic and/or basic ions as desired. In a particularly preferred embodiment commercially available water solution of hydrogen peroxide, having concentration of about 9.8 mol/liter (30 weight %) of $H_2O_2$ was used. Though more concentrated solutions of hydrogen peroxide are also within the scope of present invention, they are less preferable for safety reasons.

It was also determined that an excess of $H_2O_2$ above the stoichiometric quantity required by equation (1) has an accelerating effect on the kinetics of the reaction and suppresses solubility of zirconium peroxosulfate in acidic solutions. Thus an excess of hydrogen peroxide above the stoichiometric $H_2O_2/Zr$ molar ratio of 3:2 is beneficial for a higher degree of recovering zirconium from the solution. Although no upper limit on the $H_2O_2/Zr$ molar ratio was found, it is preferable for practical and economical purposes not to exceed ratio of $H_2O_2$: Zr 8:1.

It was found in the present invention that a concentration of zirconium species in the acidic peroxide solution is another important factor in determining the degree of zirconium recovery in the form of zirconium peroxosulfate and the kinetics of its precipitation: when the concentration of an acidic peroxide solution is below about 0.3 g-atom Zr/liter, recovery of zirconium (as zirconium peroxosulfate) does not exceed about 15–20% even after several days of standing time. However, with a higher concentration of the zirconium species in the reaction solution, the yield of zirconium peroxosulfate increases dramatically.

While not to be bound by any theory, it is believed that this effect is connected with the processes of hydrolysis of zirconium ions and their polymerization, which are typical for solutions containing zirconium and sulfates (Blumenthal, "The Chemical Behavior of Zirconium", D. Van Nostrand Co., 1958). It is thought in the present invention that at a higher concentration, the lesser degree of hydrolysis and polymerization provides a short processing time and increases recovery of zirconium peroxosulfate up to a quantitative yield, i.e. more than 99% by weight of zirconium could be precipitated in the form of zirconium peroxosulfate.

Consequently, it is preferred that the concentration of the zirconium species in the solution be greater than about 0.5 g-atom Zr/liter. In the practice of the present invention, the maximum concentration of zirconium in the acidic peroxide solution is limited only by solubility of the zirconium species in the solution. When the zirconium species is zirconium sulfate as a practical matter, the maximum concentration of the zirconium species is about 2.5 g-atom Zr/liter at ambient temperatures. In preferred embodiments, the concentration of zirconium species in the solution is between about 0.5 and about 1.5 g-atom Zr/liter.

Once the acidic peroxide solution of zirconium has been prepared, there is a period of time when no visual changes in its appearance are observed. This latent period of the reaction ranges from tens of seconds to several hours depending on the concentration of zirconium in the acidic peroxide solution, its acidity, and the $H_2O_2/Zr$ molar ratio, among other conditions.

After the latent period is passed, the solution turns opaque due to formation of solid nuclei of zirconium peroxosulfate having an average size of a few tens of nanometers. Growth and coalescence of the nuclei results in the formation of zirconium peroxosulfate particles having the globular structure with a much larger particle size on average. These secondary particles may be up to 50 micron in size depending on the process conditions.

Growing nuclei and particles can form large clusters of zirconium peroxosulfate particles when agitation is halted after the initial latent period. Thus in the practice of the present invention agitation of the reaction mixture is required; agitation may be provided by applying to an acidic peroxide solution any of known techniques such as magnetic stirring, impeller stirring, circulation stirring, and the like. When stirring is not applied the rate of reaction decreases significantly and reaction results in formation of a solid crust of the zirconium peroxosulfate with much lower recovery of zirconium from an acidic peroxide solution.

Surprisingly, it has been determined that formation of nuclei and precipitation of zirconium peroxosulfate is not accompanied by any change in the temperature of the peroxide solution. This may indicate that the heat of the reaction is about zero, hence as follows from Le Chateau-Brown's rule, the temperature of the peroxide solution may have little or no significant impact on the reaction performance. It was determined that the rate of precipitation and yield of zirconium peroxosulfate are indeed very slightly influenced by the temperature of the acidic peroxide solution of zirconium, so long as the temperature does not exceed about 45° C.

When the temperature of the peroxide solution exceeds about 45° C., less zirconium peroxosulfate is recovered, presumably due to its increased solubility in an acidic media at elevated temperatures. Further precipitation does not appear to occur when the temperature of peroxide exceeds about 60° C. In preferred embodiments, the temperature of the acidic peroxide solution of zirconium should be maintained below 60° C.; more preferably, below 45° C.; and still more preferably, between about 40° C. and about 0° C.

It is still in the practice of present invention when the temperature of an acidic peroxide solution could be above 60° C. at the time when such a solution was prepared but then decreased down to below 60° C.; more preferably, below 45° C.; and still more preferably, between about 40° C. and about 0° C.

The chemical composition of the isolated zirconium peroxosulfate species from the above-described processes is represented by general formula (1):

$$Zr_2(SO_4)(O_2)_3 \times nH_2O \qquad (1)$$

wherein $H_2O$ represents bound or chemically bonded water in the form of molecular water, hydroxyl groups, and combinations of these, and n represents a variable amount of bound or chemically bonded water incorporated into the crystalline structure of the compound. The general formula (1) represents only a total molecular formula of the zirconium peroxosulfate and is not intended to be a structural formula describing the actual nature of chemical bonds existing in the compound or the chemical nature of its constituents.

It is believed in the present invention that the zirconium species in zirconium peroxosulfate exist in an anionic form. It is demonstrated by its reaction with oxalic acid: when an aqueous solution of oxalic acid was added to an acidic aqueous solution of zirconium peroxosulfate, zirconium oxalate did not precipitate. Moreover, zirconium peroxosulfate is easy soluble in an aqueous solution of oxalic acid, and such solutions are stable even under heating. Considering this data, it is speculated that the chemical nature of zirco nium peroxosulfate may be more accurately represented by the formula (2):

$$H_4[(ZrO)_2(SO_4)(O_2)_3] \times mH_2O \quad (2)$$

wherein m is selected to be between 5 and 10.

The anionic zirconium species of zirconium peroxosulfate are similar to the zirconium species present in zirconium sulfate. It was by suggested (Blumenthal, "*The Chemical Behavior of Zirconium*", D. Van Nostrand Co., 1958.) that zirconium sulfate is, in fact, not a salt but zirconylsulfuric acid having composition of $H_2[ZrO(SO_4)_2] \times 3H_2O$; similarly, when an oxalate salt or oxalic acid is added to an aqueous solution of zirconylsulfuric acid, no zirconium oxalate is precipitated.

The amount of bound or chemically bonded water that is incorporated into the crystalline structure of zirconium peroxosulfate depends on the preparation and drying conditions and typically varies from 7 to 12 moles to 2 g-atoms of Zr. Consequently n in formula (1) can be between about 7 and about 12 and need not necessarily be a discrete integer.

When zirconium peroxosulfate is precipitated or dried at a temperature lower than 30° C., the value of n is between about 10 to about 12. FIGS. 3A and 3B illustrate X-ray diffraction patterns for these species. Drying at an elevated temperature, but not higher than 80° C., results in decreased value of n and an accompanying change in X-ray diffraction patterns as shown in FIGS. 3C through 3E.

Variations in content of water does not influence molar ratio of $SO_4/Zr$ and $(O_2)/Zr$ which was found to be about 1:2 and 3:2, respectively, when value of n is between 7 and 12.

At a temperature of about 80° C., zirconium peroxosulfate starts to decompose, releasing oxygen gas and forming X-ray amorphous products with a molar $SO_4/Zr$ ratio of about 1:2 and $O_2/Zr$ molar ratio lower than 3:2. The oxygen to zirconium molar ratio gradually decreases as the drying temperature increases. Formation of a zirconium product free of peroxide groups occurs when zirconium peroxosulfate is heated to a temperature of higher than about 150° C. (see FIGS. 3F and 4A).

The strong bond between the peroxide groups and zirconium provides for a long storage life of zirconium peroxosulfate. It has been observed that after more than nine years of being kept at ambient temperature, no significant changes in composition, particles morphology, and X-ray pattern were found for zirconium peroxosulfate prepared according to the present invention.

Full decomposition of zirconium peroxosulfate accompanying with $SO_3$ gas evolution occurs at about 750° C. as indicated by the mass lost during the thermal decomposition (see FIG. 4B). Particles of zirconium dioxide, which is one of the products of thermal decomposition, retain the globular morphology of that exhibited by zirconium peroxosulfate (FIG. 5). Partially decomposed zirconium peroxosulfate, for example products received after firing at 600–750° C. still contain sulfates but characterized as having high specific surface area of more than 40 m²/g.

It has been found in the present invention that when zirconium peroxosulfate is neutralized with bases, for example, ammonium hydroxide, ammonium carbonate, or ammonium bicarbonate, sulfate-free zirconium derivatives containing peroxide groups are formed. The sulfate-free zirconium derivatives were determined to include about one peroxide group per atom of zirconium. The zirconium species in the sulfate-free derivative is still thought to be anionic. When sulfate-free derivatives are dissolved in acids no precipitation of zirconium oxalate was observed when such solutions are mixed with a solution of oxalic acid.

It has been determined that the sulfate-free derivatives can be isolated as a powder. These powders exhibit a similar globular structure as that of the zirconium peroxosulfate powder (see FIG. 6A). When the sulfate-free derivatives are fired at a temperature of higher that 400° C., they transform into zirconium dioxide powder having the same particles morphology as the maternal product (see FIG. 6B).

It has also been determined that zirconium peroxosulfate and the sulfate-free derivative are suitable for manufacturing a wide variety of stabilized zirconia powders. Stabilized zirconia is defined in the art as zirconium dioxide crystallized in tetragonal or cubic crystalline modifications, wherein the said modifications are rendered stable through incorporating atoms of so-called stabilizers into ZrO2 crystalline lattice. Yttrium, cerium, rare earth elements, as well as any combination of these, and also magnesium and calcium are examples of well known in the art stabilizing dopants for zirconia.

The process of the present invention for producing a stabilized zirconia powder may comprise contacting zirconium peroxosulfate or its sulfate-free derivatives with a stabilizer compound to form a zirconia precursor. It is thought that the stabilizer compound serves to stabilize the zirconia in the tetragonal phase, the cubic phase, or a mixture of these two phases. The stabilizer compound can be a salt of the element selected from the group consisting of yttrium, cerium, any rare earth element, magnesium, calcium and mixtures thereof.

The anionic component of the stabilizer compound can be selected from the group including carbonates, hydroxides, oxalates, oxides, acetates, nitrates, sulfates, chlorides, and a mixture thereof. The stabilizer compound can be soluble or insoluble in the reaction media.

The contact with the stabilizer compound may occur in a liquid selected from the group consisting of water, alcohol, and a mixture thereof. After removing the by-products and excess of reagents the resulting solid or precursor can be calcined to remove gaseous by-products and to form the stabilized zirconia powder (FIGS. 7A–B). The X-ray diffraction pattern and SEM micrograph of the resulting stabilized zirconia powder are illustrated in FIGS. 7A and 7B, respectively.

It has also been determined that powders of zirconium peroxosulfate possess antiseptic and styptic properties due to a high content of available or active oxygen which is about 15 weight %. Unlike solutions of hydrogen peroxide of the same or even much lower concentration of active oxygen, powders of zirconium peroxosulfate do not cause burns or irritations when applied on the skin or wounds even for a long time.

The following examples illustrate the present invention in further detail. It is to be understood that these examples are for illustrative purposes only and neither the spirit nor scope of this invention is to be limited thereby.

In the following examples, the physical and chemical characteristics were measured by the methods described below.

EXAMPLES

Determination of Chemical Composition of Products

Content of zirconia was determined as nonvolatile solids content in a sample calcined at 1000° C. for 2 hours. The content of zirconia herein after relates to total $Zr(Hf)O_2$ content unless specified.

In the forgoing description of the present invention, the few percent of hafnium that always associated with zirconium ores and compounds, unless special efforts are taken to remove it, has been ignored since zirconium and hafnium are unique in that their chemical behaviors are almost identical and are much more alike. In the present case, the hafnium goes through the same transformations as the zirconium, so it is reasonable to expect formation of a new hafnium compound which has a similar chemical composition and properties as the zirconium compound does.

Content of peroxo groups was calculated as equivalent to that of hydrogen peroxide as measured by permanganate titration of a sample dissolved in concentrated sulfuric acid.

Content of sulfates was determined by wet chemical technique in the form of barium sulfate.

Content of impurities was determined by inductively coupled plasma (ICP) emission spectroscopic analysis and X-ray fluorescent analysis.

Characterization of the Products

Particle size and particle size distribution of the products were determined by laser light scattering photometry using a GALAI CIS-1 analyzer.

Scanning electron microscopy (SEM) was performed using a JEOL JSM-5300 electron microscope.

X-ray diffraction analysis was performed using the apparatus Philips, CuK alfa Ni filtered irradiation.

Example 1

Reagent grade zirconium sulfate, $Zr(SO_4)_2 \times 4H_2O$ in the amount of 716.0 g (which is by content equivalent to 2.02 mol of zirconium oxide) was dissolved with stirring in 800 ml of water; the resulting solution was filtered to provide a clear solution. The aqueous solution of zirconium sulfate was then mixed with 840 ml of an aqueous hydrogen peroxide solution having a concentration of 9.8 mol/liter $H_2O_2$ (30 wt % $H_2O_2$). The resultant acidic peroxide solution of zirconium had a concentration of zirconium of 1.1 Zr g-atom/liter, a sulfate/zirconium molar ratio of 2.0, a hydrogen peroxide/zirconium molar ratio of 4.09, and an acidity of about 4N total acid per g-atom zirconium.

The solution was maintained at ambient temperature of 25° C. and stirred. After about 15 minutes, the reaction started and the clear solution turned opaque due to formation of colloidal nuclei followed by precipitation of secondary particles. In about 4 hours, the resultant white precipitate was filtered off, and the obtained filter cake was washed with water until no more sulfate ions were detected in the wash water by its reaction with a solution of barium chloride.

The washed filter cake was dried at 35° C. for 24 hours, and zirconium peroxosulfate was obtained as a white powder in a quantity of 595.0 g. About 99.5% of zirconium taken for the reaction was recovered in the form of zirconium peroxosulfate powder.

According to chemical analysis, the dry powder contained 41.3 weight % $ZrO_2$, 16.3 weight % $SO_4$, and 17.1 weight % $H_2O_2$, which is equivalent to the chemical composition represented by the general formula $Zr_2(SO_4)(O_2)_3 \times 12H_2O$. Its X-Ray diffraction pattern and microstructure are presented in FIG. 1 and FIG. 2, respectively.

Example 2

Reagent grade zirconium sulfate, $Zr(SO_4)_2 \times 4H_2O$ in the amount of 716.0 g, which is by content equivalent to 2.02 mol of zirconium oxide, was dissolved by stirring in a mixture of 800 ml of deionized water and 1050 ml of an aqueous hydrogen peroxide solution having a concentration of 9.8 mol/liter $H_2O_2$ (30 weight % $H_2O_2$). The resultant acidic peroxide solution had zirconium concentration of 0.98 g-atom/liter, sulfate/zirconium molar ratio of 2:1, hydrogen peroxide/zirconium molar ratio of 5.09:1, and an acidity of about 4N total acid per g-atom zirconium.

The solution was filtered. The clear solution was maintained at an ambient temperature of about 25° C. with stirring. After about 5 minutes, the reaction started and the clear solution turned opaque due to formation of colloidal particles. After about 2 hours, the resultant white precipitate was filtered off and the obtained filter cake was washed with water until no more sulfate ions were detected in the wash water by its reaction with a solution of barium chloride.

The washed filter cake was dried at 55° C. for 4 hours. Zirconium peroxosulfate was obtained as a white powder in a quantity of 550.0 g. About 99.7% of zirconium originally added to the reaction was recovered in the form of zirconium peroxosulfate powder.

According to chemical analysis, the dry powder contained 44.8 weight % $ZrO_2$, 17.1 weight % $SO_4$, and 18.1 weight % $H_2O_2$, which is equivalent to the chemical composition represented by the general formula $Zr_2(SO_4)(O_2)_3 \times 10H_2O$.

Example 3

Zirconium basic carbonate in the amount of 600.0 g, equivalent by content to 1.95 mol of zirconium oxide, was dissolved in 725 ml of sulfuric acid having a concentration of 6.62 mol/liter (~47.4 weight % $H_2SO_4$). The resultant zirconium-containing sulfate solution, which measured 900 ml, was mixed with 1,200 ml of a hydrogen peroxide aqueous solution having a concentration of 9.8 mol/liter $H_2O_2$ (30 weight % $H_2O_2$).

The prepared acidic peroxide solution had a concentration of zirconium of 0.93 g-atom Zr/liter, a sulfate/zirconium molar ratio of 2.46:1, a hydrogen peroxide/zirconium molar ratio of 6.03:1, and an acidity of about 4.9 N total acid per g-atom zirconium.

The solution was stirred and maintained at an ambient temperature of about 20° C. In about 45 minutes, the reaction started and the clear solution turned opaque due to formation of colloidal particles of solids. After about 6 hours, the resultant white precipitate was filtered off and the filter cake produced was washed with water until no more sulfate ions were detected in the wash water by its reaction with a solution of barium chloride. The washed filter cake was dried at 45° C. for 4 hours to yield zirconium peroxosulfate as a white powder in a quantity of 544.0 g. About 99.8% of zirconium added to the reaction was recovered in the form of zirconium peroxosulfate powder.

According to chemical analysis, the dry powder contained 44.1 weight % $ZrO_2$, 17.2 weight % $SO_4$, and 18.5 weight % $H_2O_2$ which is equivalent to the chemical composition represented by the general formula $Zr_2(SO_4)(O_2)_3 \times 10H_2O$.

Example 4

The zirconium containing sulfate solution was prepared as described in Example 3. Metal impurities were intentionally incorporated in the prepared solution: sulfate salts of iron, aluminum, sodium, chromium, titanium, calcium, and magnesium were dissolved in the solution in a quantity of 1 weight % of each metal with respect to content of zirconium. The thus prepared solution with intentionally incorporated impurities was processed as described in Example 3.

The washed filter cake was dried at 45° C. for 4 hours and zirconium peroxosulfate was obtained as a white powder in a quantity of 539.0 g. According to chemical analysis, about 99% of zirconium taken for the reaction was recovered in the form of high purity zirconium peroxosulfate powder having composition of about $Zr_2(SO_4)(O_2)_3 \times 10H_2O$.

The obtained powder was analyzed on metal impurities content and was found to contain less than 10 ppm of each of metals originally incorporated into the solution as impurities. Thus the content of the impurities originally added to the solution was decreased more than 1,000 times for each element and more than 7,000 times total.

The following Examples 5 and 6 are to demonstrate high efficiency of the process of the present invention in separation and purification of zirconium from natural ores.

Example 5

Baddelite powder, a natural zirconium ore, (300.0 g) was mixed with 335 ml. (6.0 mol.) of concentrated sulfuric acid having density 1.83 g/ml in a quartz beaker. The solution was placed on a hot plate heated to 200° C. and maintained at this temperature for 6 hours to remove water. The heated mixture in the form of a spongy solid was cooled down to room temperature and mixed with 1,300 ml of water to leach out zirconium sulfate.

After stirring for 1 hour, the slurry was filtered out from insoluble solid residues and non-reacted baddelite. At this step, 90% of original zirconium was recovered as 1,500 ml of clear zirconium sulfate containing solution with concentration of 1.44 g-atom/liter and a molar ratio of $SO_4/Zr$ of 2.2.

The solution was mixed with 920 ml of a hydrogen peroxide aqueous solution having a concentration of 9.8 mol/liter $H_2O_2$ (30 weight % $H_2O_2$); this resulted in 2,420 ml of acidic peroxide solution of zirconium having concentration of 0.89 g-atom Zr/liter at molar ratio $H_2O_2/Zr$ of 4.2:1 and an acidity of about 4.4N total acid per g-atom zirconium.

The solution was maintained at an ambient temperature of 20° C. under stirring for 6 hours. The obtained white precipitate of zirconium peroxosulfate was then filtered off, washed with 300 ml of a 3 weight % $H_2SO_4$ solution, and then with water until no more sulfate ions were detected in the wash water by its reaction with a solution of barium chloride.

The washed filter cake was dried at 45° C. for 4 hours, and zirconium peroxosulfate was obtained as a white powder in a quantity of 603.0 g. According to chemical analysis, the dry powder contained 44.3 weight % $ZrO_2$, 17.1 weight % $SO_4$, and 18.2 weight % $H_2O_2$ which is equivalent to the chemical composition represented by the formula $Zr_2(SO_4)(O_2)_3 \times 10H_2O$.

Dry powder of zirconium peroxosulfate was then calcined in air at 900° C. for 2 hours, which resulted in the formation of zirconium dioxide as a white powder in a quantity of 267.0 g. This corresponded to 99% by recovery of zirconium originally contained in the acidic peroxide solution or 89% recovery of zirconium taken as baddelite.

The content of impurities in the initial sample of baddelite and the zirconium dioxide recovered through precipitation of zirconium peroxosulfate is compared in Table 1.

TABLE 1

|  | Na | Ca | Mg | Al | Ti | Si | Fe | Mn | Ni | V | Cu | Hf | U + Th |
|---|---|---|---|---|---|---|---|---|---|---|---|---|---|
| Baddelite | 40 | 400 | 300 | 200 | 1500 | 6000 | 500 | 70 | 10 | 500 | 500 | 1.33 | >300 |
| ZrO$_2$ from zirconium peroxosulfate | 5 | 4 | 2 | 5 | 30 | <10 | 10 | 0.3 | <5 | 5 | <1 | 1.29 | ND* |

The content of impurities is given in parts per million (ppm) except for Hf, which content is given in weight %
*ND = Non Detectable Example 6

A mixture of 184.0 g zircon sand (natural zirconium ore) and 180.0 g solid sodium hydroxide was prepared in accordance with equation (2):

$$ZrSiO_4 + 4NaOH \rightarrow Na_2ZrO_3 + Na_2SiO_3 + 2H_2O \qquad (2)$$

The mixture was placed in a steel crucible and calcined at 950° C. for 4 hours. The baked mixture, when cooled down to ambient temperature, was crushed to form lumps of about half an inch in size and placed in 1,000 ml of water to leach out sodium silicate.

After stirring for about 2 hours, the solids, thought to be mainly sodium zirconate and some of undigested zircon, were separated from the solution by filtration. The resulting moist filter cake was placed into a mixture of 200 ml water and 174 ml (3.1 mol) concentrated sulfuric acid having a density of 1.83 g/ml.

After stirring for 1 hour at 80° C., the slurry was brought to a volume of 800 ml with water. Insoluble solid residues were filtered out. At this step, 95% of original zircon sand load was recovered as 800 ml of a clear zirconium sulfate containing solution having a concentration of about 1.2 g-atom Zr/liter and a $SO_4/Zr$ molar ratio of about 3.3:1.

The solution was cooled down to 40° C. and mixed with 510 ml of an aqueous hydrogen peroxide solution having a concentration of 9.8 mol/liter $H_2O_2$ (30 weight % $H_2O_2$), which resulted in about 1,300 ml of acidic peroxide solution of zirconium having concentration of 0.91 Zr g-atom/liter at molar ratio $H_2O_2/Zr$ of 5:1 and an acidity of about 4.2 N total acid per g-atom zirconium. The acidic peroxide solution of zirconium was maintained at an ambient temperature of 25° C. under stirring for about 6 hours. The precipitated zirconium peroxosulfate was then filtered off, washed with 200 ml of 3 weight % $H_2SO_4$ solution, and then with water until no more sulfate ions were detected in the wash water by its reaction with a solution of barium chloride.

The resulting washed filter cake was dried at 45° C. for 4 hours. Zirconium peroxosulfate was obtained as a white powder in a quantity of 257.0 g. According to chemical analysis, the dry powder contained 44.1 weight % $ZrO_2$, 17.3 weight % $SO_4$, and 18.0 weight % $H_2O_2$ which is equivalent to the chemical composition represented by the formula $Zr_2(SO_4)(O_2)_3 \times 10H_2O$.

The dry, powdered zirconium peroxosulfate was then calcined in air at 900° C. for 2 hours, which resulted in formation of a white powder of zirconium dioxide in a quantity of 113.5 g. This corresponded to 97% recovery of zirconium originally added to the acidic peroxide solution or 92% recovery of zirconium taken as zircon sand ore.

The content of impurities in the sample of zirconium dioxide recovered through precipitation of zirconium peroxosulfate was found to be as follows:

Na-50, Ca-5, Mg-5, Al-5, Ti-30, Si-20, Fe-10 ppm, (U+Th)-undetectable

Example 7

Zirconium basic carbonate (150.0 g, which is by content equivalent to 0.49 mol of zirconium oxide) and 70.4 g (0.49 mol) of sodium sulfate were dissolved in 140 ml of hydrochloric acid having a concentration of 6.45 mol/liter. This resulted in obtaining of about 300 ml of solution containing zirconium sulfate. The resultant solution was then cooled down to 15° C. and mixed with 280 ml of an aqueous hydrogen peroxide solution having a concentration of 9.8 mol/liter $H_2O_2$ (30 weight % $H_2O_2$).

The thus prepared acidic peroxide solution had concentration of 0.84 g-atom Zr/liter, a sulfate/zirconium molar ratio of 1:1, a hydrogen peroxide/zirconium molar ratio of 6.0:1, and an acidity of about 1.8 N total acid per g-atom zirconium.

The solution was cooled down to 12° C. and allowed to stay under stirring. After about one hour the reaction started and the clear solution turned opaque due to formation colloidal particles. The reaction could be described by the following general equation (3):

$$0.49ZrOCl_2 + 0.49Na_2SO_4 + 2.94H_2O_2 \rightarrow 0.245[Zr_2(SO_4)(O_2)_3] + 0.98\ NaCl + 0.245H_2SO_4 + 2.205H_2O_2 \quad (3)$$
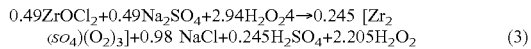

After about 12 hours, the resultant white precipitate was filtered off and the obtained filter cake was washed with water until no more sulfate ions were detected in the wash water by its reaction with a solution of barium chloride. The washed filter cake was dried at 35° C. for 6 hours to yield zirconium peroxosulfate as a white powder in a quantity of 139.0 g. About 95.2% of zirconium originally added to the reaction was recovered in the form of zirconium peroxosulfate powder having sodium content of less than 20 ppm.

According to chemical analysis, the dry powder contained 41.3 weight % $ZrO_2$, 16.0 weight % $SO_4$, and 17.1 weight % $H_2O_2$ which is equivalent to the chemical composition represented by the general formula $Zr_2(SO_4)(O_2)_3 \times 12H_2O$.

Example 8

Zirconium basic carbonate (150.0 g, which is by content equivalent to 0.49 mol of zirconium oxide) and 70.4 g sodium sulfate (0.49 mol) was dissolved in 140 ml of nitric acid having concentration of 6.45 mol/liter. The resultant zirconium containing sulfate solution at a quantity of about 300 ml was then cooled down to 15° C. and mixed with 280 ml of hydrogen peroxide aqueous solution having concentration of 9.8 mol/liter $H_2O_2$ (30 weight % $H_2O_2$).

The thus prepared acidic peroxide solution had zirconium concentration of 0.84 g-atom/liter, a sulfate/zirconium molar ratio of 1:1, a hydrogen peroxide/zirconium molar ratio of 6.0:1, and an acidity of about 1.8 N total acid per g-atom zirconium.

This solution was allowed to stay at ambient temperature of 22° C. under stirring. After about one hour the reaction started and the clear solution turned opaque due to formation colloidal particles. The reaction could be described by the following general equation (4):

$$0.49ZrO(NO_3)_2 + 0.49Na_2SO_4 + 2.94H_2O_2 \rightarrow 0.245[Zr_2(SO_4)(O_2)_3] + 0.9NaNO_3 + 0.245H_2SO_4 + 2.205H_2O_2 \quad (4)$$
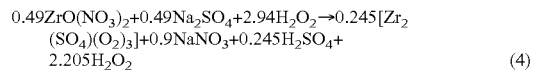

After about 8 hours, the resultant white precipitate was filtered off and the produced filter cake was washed with water until no more sulfate ions were detected in the wash water by its reaction with a solution of barium chloride.

The washed filter cake was dried at 35° C. for 6 hours and zirconium peroxosulfate was obtained as a white powder in a quantity of 138.0 g. About 98.5% of zirconium originally added to the reaction was recovered in the form of zirconium peroxosulfate powder having sodium content of less than 20 ppm.

According to chemical analysis the dry powder contained 43.0 weight % $ZrO_2$, 16.8 weight % $SO_4$ and 17.6 weight % $H_2O_2$ which is equivalent to the chemical composition represented by the general formula $Zr_2(SO_4)(O_2)_3 \times 11H_2O$.

Example 9

The following Example 9 is to demonstrate a process for preparing a sulfate-free derivative of zirconium peroxosulfate.

The washed moist cake of zirconium peroxosulfate in the amount of 200.0 g containing about 44 g (0.36 mol) of $ZrO_2$ was prepared as described in Example 3. This moist cake was re-dispersed in 200 ml of distilled water. The slurry was mixed with 25 ml of an aqueous ammonium hydroxide solution having concentration of 13.3 mol/liter $NH_3$ (about 25 weight %) and the mixture was stirred for about 30 min. The solids were then separated from a solution by filtration and washed with distilled water until no sulfates were detected in the wash water by the reaction with barium chloride.

The obtained filter cake was dried at about 35° C. resulting in 62.3 g of white powder having the same as original zirconium peroxosulfate globular microstructure of the particles and containing 70.2 weight % of $ZrO_2$ and 19.1 weight % of $H_2O_2$. Content of sulfate ions in the obtained powder was determined to be less than 0.01 weight %.

According to the chemical analysis the powder of sulfate-free derivative of zirconium peroxosulfate had a composition close to $ZrO(O_2) \times 2H_2O$. About 99.4% of zirconium taken in the reaction as zirconium peroxosulfate was recovered in the form of zirconium peroxide.

Example 10

The following Example 10 is to illustrate a process for preparing yttrium-stabilized zirconia powder in tetragonal crystalline phase.

The washed moist cake of zirconium peroxosulfate (200.0 g) was prepared as described in Example 3 and contained about 44 g (0.36 mol) of $ZrO_2$. The cake was re-dispersed or suspended in 200 ml of distilled water and then 3.45 g of yttrium oxide powder having a mean particle size of about 2.2 microns was added to the resultant slurry.

An aqueous ammonium hydroxide solution (25 ml) with a concentration of 13.3 mol/liter $NH_3$ (about 25 weight %) was then mixed with the slurry; the mixture was stirred for about 30 minutes. The solids were then separated from a solution by filtration and washed with distilled water until no sulfates were detected in the wash water by the reaction with barium chloride.

The filter cake was then dried at 90° C. and calcined at 800° C. for 2 hours to yield 47.3 g of yttrium stabilized zirconia powder containing 7.5 weight % of $Y_2O_3$ and having an average particle size of about 28 microns. An X-ray diffraction pattern of the obtained powder (FIG. 7A) indicates that the crystal phase of the produced stabilized zirconia was a tetragonal phase only—no monoclinic zirconia phase was detected. As seen from FIG. 7B, particles of the obtained stabilized zirconia powder preserve the same globular structure of the initial zirconium peroxosulfate.

Although the invention has been described in detail with reference to certain preferred embodiments, those skilled in the art will recognize that there are other embodiments of the invention within the spirit and the scope of the claims.

What is claimed is:

1. A process for preparing a peroxide compound of zirconium comprising:
    combining a zirconium species, a sulfate ion species and hydrogen peroxide to provide an acidic peroxide solution containing zirconium and sulfate, said solution having a concentration of zirconium of not less than 0.3 g-atom/liter, a sulfate/zirconium molar ratio of greater than about 1:2, a hydrogen peroxide/zirconium molar ratio of greater than about 3:2, and an acidity of less than about 7 N total acid per g-atom of zirconium;
    agitating and maintaining the acidic peroxide solution at a temperature of not higher than about 60° C. to provide a precipitate comprising particles of zirconium peroxosulfate; followed by
    separating and washing the precipitate,
wherein said process provides recovery in the form of the peroxide compound of zirconium of at least 25% by weight of the zirconium contained in the acidic peroxide solution within 24 hours after preparing said acidic peroxide solution of zirconium.

2. The process of claim 1, wherein the acidic peroxide solution has a concentration of zirconium of not less than 0.5 g-atom/liter and at least 90% by weight of zirconium contained in the solution is recovered in the form of the peroxide compound of zirconium within 24 hours after preparing said acidic peroxide solution of zirconium.

3. The process of claim 2, wherein the acidic peroxide solution has a sulfate/zirconium molar ratio of not less than 1:1, hydrogen peroxide/zirconium molar ratio of not less than 4:1, acidity of less than about 6 N total acid per g-atom of zirconium, and wherein at least 98% by weight of zirconium contained in the acidic peroxide solution is recovered in the form of the peroxide compound of zirconium within 10 hours after preparing said acidic peroxide solution of zirconium.

4. A process for preparing a powder containing globular particles of zirconium dioxide comprising: combining a zirconium species, a sulfate ion species and hydrogen peroxide to provide an acidic peroxide solution containing zirconium and sulfate, said solution having a concentration of zirconium of not less than 0.3 g-atom/liter, a sulfate/zirconium molar ratio of greater than about 1:2, a hydrogen peroxide/zirconium molar ratio of greater than about 3:2, and an acidity of less than about 7 N total acid per g-atom of zirconium;
    agitating and maintaining the acidic peroxide solution at a temperature of not higher than about 60° C. to provide a precipitate comprising particles of zirconium peroxosulfate;
    separating and washing the precipitate, thereby providing recovery in the form of the the zirconium peroxide compound zirconium peroxosulfate of at least 25% by weight of the zirconium contained in the acidic peroxide solution within 24 hours after preparing said acidic peroxide solution of zirconium;
    drying said washed precipitate of zirconium peroxosulfate; followed by
    calcining the dried precipitate at a temperature higher than about 750° C. to obtain said powder.

5. A process for preparing stabilized zirconium dioxide powder in the tetragonal or cubic crystalline phase comprising: combining a zirconium species, a sulfate ion species and hydrogen peroxide to provide an acidic peroxide solution containing zirconium and sulfate, said solution having a sulfate/zirconium molar ratio of greater than about 1:2, a hydrogen peroxide/zirconium molar ratio of greater than about 3:2, and an acidity of less than about 7 N total acid per g-atom of zirconium;
    agitating and maintaining the acidic peroxide solution at a temperature of not higher than about 60° C. to provide a precipitate comprising particles of zirconium peroxosulfate;
    separating and washing the precipitate;
    mixing of said zirconium peroxosulfate with a stabilizer compound, wherein said stabilizer compound is a compound selected from the group consisting of compounds of yttrium, cerium, rare earth elements, magnesium, calcium and mixtures thereof; followed by
    calcination of the mixture to obtain said powder.

6. The process of claim 5, wherein said acidic peroxide solution has a concentration of zirconium of not less than 0.3 g-atom/liter thereby providing recovery of at least 25% by weight of the zirconium in the form of zirconum peroxosulfate precipitate within 24 hours after preparing said acidic peroxide solution of zirconium.

7. A process for preparing sulfate-free peroxo zirconium derivatives comprising:
    combining a zirconium species, a sulfate ion species and hydrogen peroxide to provide an acidic peroxide solution containing zirconium and sulfate, said solution having a sulfate/zirconium molar ratio of greater than about 1:2, a hydrogen peroxide/zirconium molar ratio of greater than about 3:2, and an acidity of less than about 7 N total acid per g-atom of zirconium;
    agitating and maintaining the acidic peroxide solution at a temperature of not higher than about 60° C. to provide a precipitate comprising particles of zirconium peroxosulfate;
    separating and washing said precipitate; followed by
    neutralization of zirconium peroxosulfate precipitate with bases to obtain said sulfate-free peroxo zirconium derivatives.

8. A process for preparing a powder containing globular particles of zirconium dioxide comprising: combining a zirconium species, a sulfate ion species and hydrogen peroxide to provide an acidic peroxide solution containing zirconium and sulfate, said solution having a sulfate/zirconium molar ratio of greater than about 1:2, a hydrogen peroxide/zirconium molar ratio of greater than about 3:2, and an acidity of less than about 7 N total acid per g-atom of zirconium;
    agitating and maintaining the acidic peroxide solution at a temperature of not higher than about 60° C. to provide a precipitate comprising particles of zirconium peroxosulfate;

separating and washing said precipitate;

neutralization of said precipitate with bases to obtain sulfate-free peroxo zirconium derivatives;

calcination of said sulfate-free peroxo zirconium derivatives at a temperature higher than about 400° C. to obtain said powder.

9. A process for preparing stabilized zirconium dioxide powder in the tetragonal or cubic crystalline phase comprising: combining a zirconium species, a sulfate ion species and hydrogen peroxide to provide an acidic peroxide solution containing zirconium and sulfate, said solution having a sulfate/zirconium molar ratio of greater than about 1:2, a hydrogen peroxide/zirconium molar ratio of greater than about 3:2, and an acidity of less than about 7 N total acid per g-atom of zirconium;

agitating and maintaining the acidic peroxide solution at a temperature of not higher than about 60° C. to provide a precipitate comprising particles of zirconium peroxosulfate;

separating and washing said precipitate;

neutralization of said precipitate with bases to obtain sulfate-free peroxo zirconium derivatives;

mixing of said sulfate-free peroxo zirconium derivatives with a stabilizer compound, wherein said stabilizer compound is a compound selected from the group consisting of compounds of yttrium, cerium, rare earth elements, magnesium, calcium and mixtures thereof; followed by calcination of the mixture to obtain said powder.

10. A process for separation of zirconium in the form of zirconium peroxide compound from metallic and/or nonmetallic compounds and purification of zirconium from impurities, said process comprising:

combining a zirconium species containing metallic and/or nonmetallic compounds and/or impurities, a sulfate ion species and hydrogen peroxide to provide an acidic peroxide solution, said solution having a sulfate/zirconium molar ratio of greater than about 1:2, a hydrogen peroxide/zirconium molar ratio of greater than about 3:2, and an acidity of less than about 7 N total acid per g-atom of zirconium;

agitating and maintaining the acidic peroxide solution at a temperature of not higher than about 60° C. to provide a precipitate comprising particles of zirconium peroxosulfate;

separating the precipitate; and washing the precipitate wherein said zirconium in the form of the zirconium peroxide compound zirconium peroxosulfate is separated from said metallic and/or nonmetallic compounds and/or impurities.

11. The process of claim 10, wherein the acidic peroxide solution of zirconium has a concentration of zirconium not less than 0.5 g-atom/liter, a sulfate/zirconium molar ratio of not less than 1:1 and a hydrogen peroxide/zirconium molar ratio of not less than 4:1, and wherein at least 90% by weight of zirconium contained in the said solution is recovered in the form of the peroxide compound of zirconium within 24 hours after preparing said acidic peroxide solution.

12. The process of claim 10, wherein the acidic peroxide solution of zirconium has an acidity of less that about 6 N total acid per g-atom of zirconium, and wherein at least 98% by weight of zirconium contained in the acidic peroxide solution is recovered in the form of the peroxide compound of zirconium within 10 hours after preparing said acidic peroxide solution.

* * * * *